United States Patent
Chen et al.

(10) Patent No.: US 11,269,776 B2
(45) Date of Patent: Mar. 8, 2022

(54) DIRECT INPUT/OUTPUT PATH TO COMPRESSED DATA

(71) Applicant: EMC IP Holding Company LLC, Hopkinton, MA (US)

(72) Inventors: Xiangping Chen, Sherborn, MA (US); Philippe Armangau, Acton, MA (US); Anton Kucherov, Dudley, MA (US); Xunce Zhou, Shrewsbury, MA (US); William C. Davenport, San Diego, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 104 days.

(21) Appl. No.: 16/656,222

(22) Filed: Oct. 17, 2019

(65) Prior Publication Data
US 2021/0117328 A1   Apr. 22, 2021

(51) Int. Cl.
| | |
|---|---|
| G06F 12/0868 | (2016.01) |
| G06F 12/0815 | (2016.01) |
| G06F 9/46 | (2006.01) |
| G06F 9/30 | (2018.01) |
| G06F 11/14 | (2006.01) |

(52) U.S. Cl.
CPC ...... *G06F 12/0868* (2013.01); *G06F 9/30047* (2013.01); *G06F 9/467* (2013.01); *G06F 11/1474* (2013.01); *G06F 12/0815* (2013.01); *G06F 2201/835* (2013.01); *G06F 2212/401* (2013.01); *G06F 2212/7201* (2013.01)

(58) Field of Classification Search
CPC .. G06F 12/0868; G06F 9/30047; G06F 9/467; G06F 11/1474; G06F 12/0815; G06F 2201/835; G06F 2212/401; G06F 2212/7201
See application file for complete search history.

(56) References Cited

U.S. PATENT DOCUMENTS

| | | | |
|---|---|---|---|
| 6,349,375 B1 * | 2/2002 | Faulkner | G06F 12/08 711/170 |
| 8,595,437 B1 * | 11/2013 | Glasco | G06F 12/0804 711/118 |
| 9,053,027 B1 | 6/2015 | Harvey et al. | |
| 9,779,023 B1 | 10/2017 | Armangau et al. | |
| 9,880,762 B1 | 1/2018 | Armangau et al. | |

(Continued)

*Primary Examiner* — Michelle T Bechtold
(74) *Attorney, Agent, or Firm* — BainwoodHuang

(57) ABSTRACT

Techniques for providing a direct IO path to compressed data on storage media of a storage system. The techniques include triggering a transaction cache to perform a flush operation for updating mapping metadata for a storage object containing the compressed data. Having updated the mapping metadata for the storage object, the techniques further include issuing, by a copier module, an IO read request for the compressed data of the storage object to a namespace layer, which issues the IO read request to a mapping layer. The techniques further include forwarding the IO read request to a logical layer of the mapping layer, bypassing the transaction cache. The techniques further include reading, by the logical layer, the compressed data of the storage object from the storage media, and providing, via the mapping layer and the namespace layer, the compressed data to the copier module for transfer to a destination storage system.

10 Claims, 3 Drawing Sheets

(56) References Cited

U.S. PATENT DOCUMENTS

| | | |
|---|---|---|
| 10,146,637 B1 | 12/2018 | Chopra et al. |
| 10,157,020 B1 | 12/2018 | Taylor et al. |
| 10,296,517 B1 | 5/2019 | Kumar et al. |
| 10,310,951 B1 | 6/2019 | Chen et al. |
| 10,318,169 B2 | 6/2019 | Dalmatov et al. |
| 10,459,642 B2 | 10/2019 | Wang et al. |
| 10,684,922 B2 | 6/2020 | Shemer et al. |
| 2017/0336984 A1* | 11/2017 | Nicol .................. G06F 3/062 |
| 2019/0235793 A1* | 8/2019 | Aikawa ............... G06F 3/0659 |
| 2019/0278484 A1* | 9/2019 | Tatsumi ............. G06F 12/0253 |
| 2021/0081544 A1* | 3/2021 | Borlick .............. G06F 12/0866 |

* cited by examiner

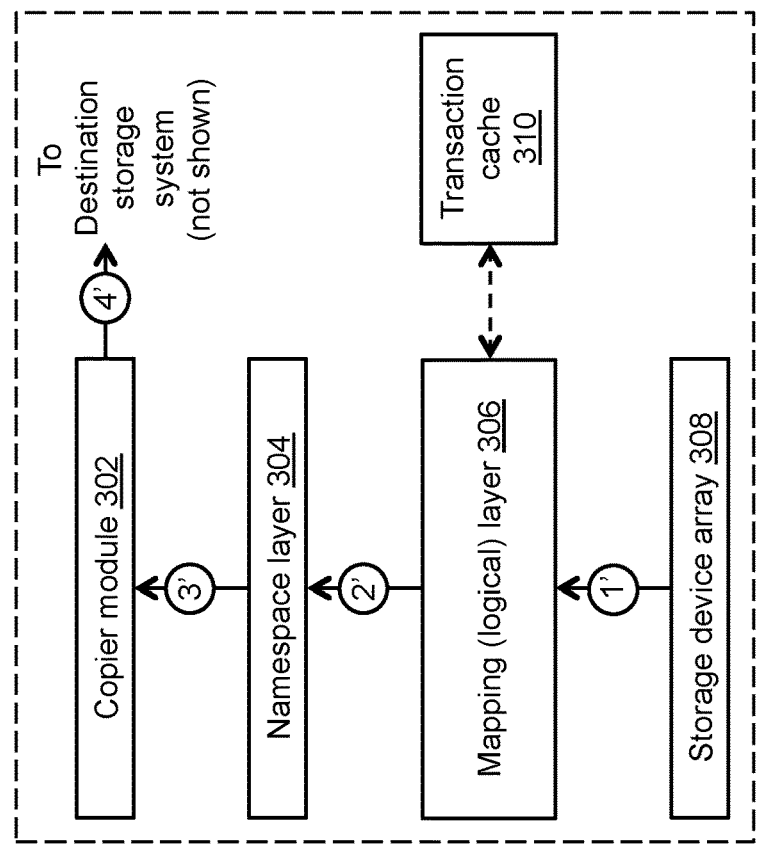
*Fig. 3*
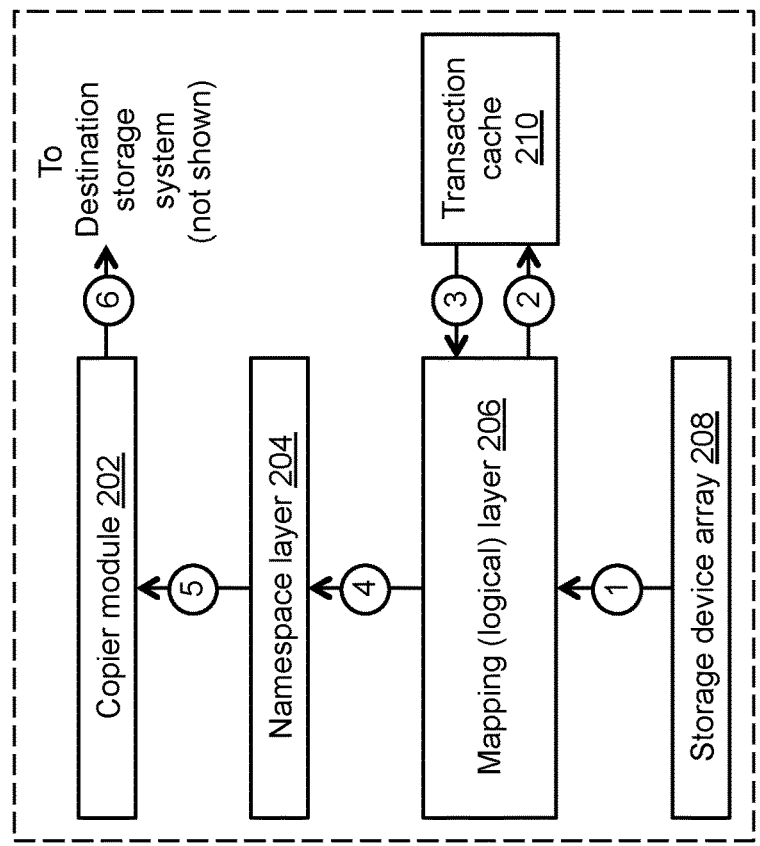
*Fig. 2 – Prior art*

DIRECT INPUT/OUTPUT PATH TO COMPRESSED DATA

BACKGROUND

Data storage systems perform asynchronous data replication (also referred to herein as "asynchronous replication") for periodically creating point-in-time (PIT) snapshot storage objects (also referred to herein as "snapshots") of a source storage object (also referred to herein as the "source object"), comparing the storage objects to determine changes or differences in data between the respective storage objects, and transmitting or transferring the data differences from a source storage system to a destination storage system for storage on a destination storage object (also referred to herein as the "destination object"). The timing of such asynchronous replication is managed by a replication management server, which is communicably connected to the source storage system and the destination storage system.

SUMMARY

During asynchronous replication at a source storage system, a snapshot of a source object can be created and stored as compressed data on storage media of the source storage system. Before determining any changes or differences in data between the snapshot and the source object, "dirty data" pages are flushed from an input/output (IO) transaction cache of the source storage system to assure that mapping metadata for the respective storage objects are updated. Having flushed the dirty data pages from the IO transaction cache and updated the mapping metadata, the compressed snapshot data are read or obtained from the storage media, decompressed, placed in the IO transaction cache, and compared with the source object data to determine the data differences between the respective storage objects. The data differences between the snapshot and the source object are then transmitted or transferred to a destination storage system for storage on a destination object.

Unfortunately, there are drawbacks to asynchronous replication schemes that can adversely affect the data transfer efficiency between a source storage system and a destination storage system. As discussed herein, such asynchronous replication schemes typically require compressed snapshot data to be read from storage media of a source storage system, decompressed, and placed in an IO transaction cache of the source storage system. However, such a process of accessing snapshot data from storage media can involve a significant amount of processing overhead, particularly with regard to management of the snapshot data in the IO transaction cache, which would not likely experience more than one cache hit for the snapshot data. A significant amount of processing overhead can also be involved when a storage IO request (i.e., an IO read request) is made for snapshot data that are absent from the IO transaction cache, resulting in a cache miss.

Techniques are disclosed herein for providing a direct IO path to compressed data on storage media of a source storage system. The disclosed techniques can be employed in asynchronous replication, synchronous replication, remote data mirroring, or any other data processing activity that would benefit from improved data transfer efficiency. The source storage system can include a copier module, an IO transaction cache, a namespace layer, a mapping (logical) layer, and storage media that can store at least one storage object containing compressed data. The disclosed techniques can include triggering the IO transaction cache to perform a flush operation for updating mapping metadata for the storage object. Once the mapping metadata for the storage object is updated, the disclosed techniques can further include issuing, by the copier module, a specialized storage IO request operation code ("opcode"), namely, an IO read compressed request, to the namespace layer, and issuing, by the namespace layer, the IO read compressed request to the mapping (logical) layer. The disclosed techniques can further include, in response to receipt of the IO read compressed request at the mapping (logical) layer, obtaining the compressed data of the storage object from the storage media while avoiding forwarding the IO read compressed request to the IO transaction cache, and providing, via the mapping (logical) layer and the namespace layer, the compressed data of the storage object to the copier module for subsequent transmission or transfer to a destination storage system.

By providing a specialized IO read compressed request for compressed data of a storage object to a mapping (logical) layer of a source storage system, obtaining, by the mapping (logical) layer, the compressed data of the storage object from storage media of the source storage system while avoiding forwarding the IO read compressed request to an IO transaction cache of the source storage system, and providing the compressed data of the storage object for subsequent transmission or transfer to a destination storage system, the transfer of storage object data from the source storage system to the destination storage system can be performed with increased efficiency.

In certain embodiments, a source data storage system includes a mapping (logical) layer, an input/output (IO) transaction cache, and storage media. In such certain embodiments, a method of transferring data from the source data storage system to a destination data storage system includes issuing a specialized IO read request for compressed data of a storage object to the mapping (logical) layer of the source data storage system, in which the IO read request for the compressed data is referred to as the "IO read compressed request." The method further incudes, in response to the IO read compressed request, obtaining, by the mapping (logical) layer, the compressed data of the storage object from the storage media of the source data storage system, while avoiding forwarding the IO read compressed request from the mapping (logical) layer to the IO transaction cache. The method further includes providing, by the mapping (logical) layer, the compressed data of the storage object for subsequent transmission or transfer to the destination data storage system.

In certain arrangements, the compressed data of the storage object is compressed read-only data of the storage object, and the method further includes validating that the IO read compressed request is against a read-only storage extent.

In certain arrangements, the compressed data of the storage object is compressed snapshot data of the storage object, and the method further includes comparing the compressed snapshot data against compressed data of the storage object to obtain differences in data between the compressed snapshot data and the compressed data of the storage object.

In certain arrangements, the method further includes providing the differences in data between the compressed snapshot data and the compressed data of the storage object for subsequent transmission or transfer to the destination data storage system.

In certain arrangements, the method further includes obtaining the compressed data of the storage object while avoiding decompressing the compressed data of the storage object.

In certain arrangements, the method further includes issuing, over a data channel, a specialized IO write request containing the compressed data of the storage object to the destination data storage system, the IO write request containing the compressed data being referred to as the "IO write compressed request."

In certain embodiments, a source data storage system includes a memory configured to accommodate a logical construct referred to as a "mapping (logical) layer," an input/output (IO) transaction cache, storage media, and storage processing circuitry configured to execute program instructions out of the memory to issue a specialized IO read request for compressed data of a storage object to the mapping (logical) layer, in which the IO read request for the compressed data is referred to as the "IO read compressed request." The storage processing circuitry is further configured to execute program instructions out of the memory, in response to the IO read compressed request, to obtain, by the mapping (logical) layer, the compressed data of the storage object from the storage media, while avoiding forwarding the IO read compressed request from the mapping (logical) layer to the IO transaction cache, and to provide, by the mapping (logical) layer, the compressed data of the storage object for subsequent transmission or transfer to a destination data storage system.

In certain arrangements, the compressed data of the storage object is compressed read-only data of the storage object, and the storage processing circuitry is further configured to execute the program instructions out of the memory to validate that the IO read compressed request is against a read-only storage extent.

In certain arrangements, the compressed data of the storage object is compressed snapshot data of the storage object, and the storage processing circuitry is further configured to execute the program instructions out of the memory to compare the compressed snapshot data against compressed data of the storage object to obtain differences in data between the compressed snapshot data and the compressed data of the storage object.

In certain arrangements, the storage processing circuitry is further configured to execute the program instructions out of the memory to provide the differences in data between the compressed snapshot data and the compressed data of the storage object for subsequent transmission or transfer to the destination storage system.

In certain arrangements, the storage processing circuitry is further configured to execute the program instructions out of the memory to obtain the compressed data of the storage object while avoiding decompressing the compressed data of the storage object.

In certain arrangements, the storage processing circuitry is further configured to execute the program instructions out of the memory to issue, over a data channel, a specialized IO write request containing the compressed data of the storage object to the destination storage system, in which the IO write request containing the compressed data is referred to as the "IO write compressed request."

In certain embodiments, a computer program product includes a set of non-transitory, computer-readable media having instructions that, when executed by processing circuitry of a computerized apparatus, cause the processing circuitry to perform a method of transferring data from a source data storage system to a destination data storage system, in which the source data storage system includes a mapping (logical) layer, an input/output (IO) transaction cache, and storage media. The method includes issuing a specialized IO read request for compressed data of a storage object to the mapping (logical) layer of the source data storage system, in which the IO read request for the compressed data is referred to as the "IO read compressed request." The method further includes, in response to the IO read compressed request, obtaining, by the mapping (logical) layer, the compressed data of the storage object from the storage media of the source data storage system, while avoiding forwarding the IO read compressed request from the mapping (logical) layer to the IO transaction cache, and providing, by the mapping (logical) layer, the compressed data of the storage object for subsequent transmission or transfer to the destination data storage system.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 2 is a block diagram of exemplary representations of a copier module, a namespace layer, a mapping (logical) layer, an IO transaction cache, and a storage device array of a typical source storage system, in which an IO path to stored compressed data includes the IO transaction cache;

FIG. 3 is a block diagram of exemplary representations of a copier module, a namespace layer, a mapping (logical) layer, an IO transaction cache, and a storage device array of the source storage system of FIG. 1, in which an IO path to stored compressed data does not include the IO transaction cache.

DETAILED DESCRIPTION

Techniques are disclosed herein for providing a direct input/output (IO) path to compressed data on storage media of a source storage system. The source storage system can include a copier module, a namespace layer, a mapping (logical) layer, and an IO transaction cache. The disclosed techniques can include triggering the IO transaction cache to perform a flush operation for updating mapping metadata for a storage object containing the compressed data. Once the mapping metadata for the storage object is updated, the disclosed techniques can further include issuing, by the copier module, a specialized IO read compressed request to the namespace layer, and issuing, by the namespace layer, the IO read compressed request to the mapping (logical) layer. The disclosed techniques can further include, in response to receipt of the IO read compressed request at the mapping (logical) layer, obtaining the compressed data of the storage object from the storage media, while avoiding forwarding the IO read compressed request to the IO transaction cache. The disclosed techniques can further include providing, via the mapping (logical) layer and the namespace layer, the compressed data of the storage object to the copier module for subsequent transmission or transfer to a destination storage system. In this way, the transfer of data from the source storage system to the destination storage system can be performed with increased efficiency.

Figure 1:
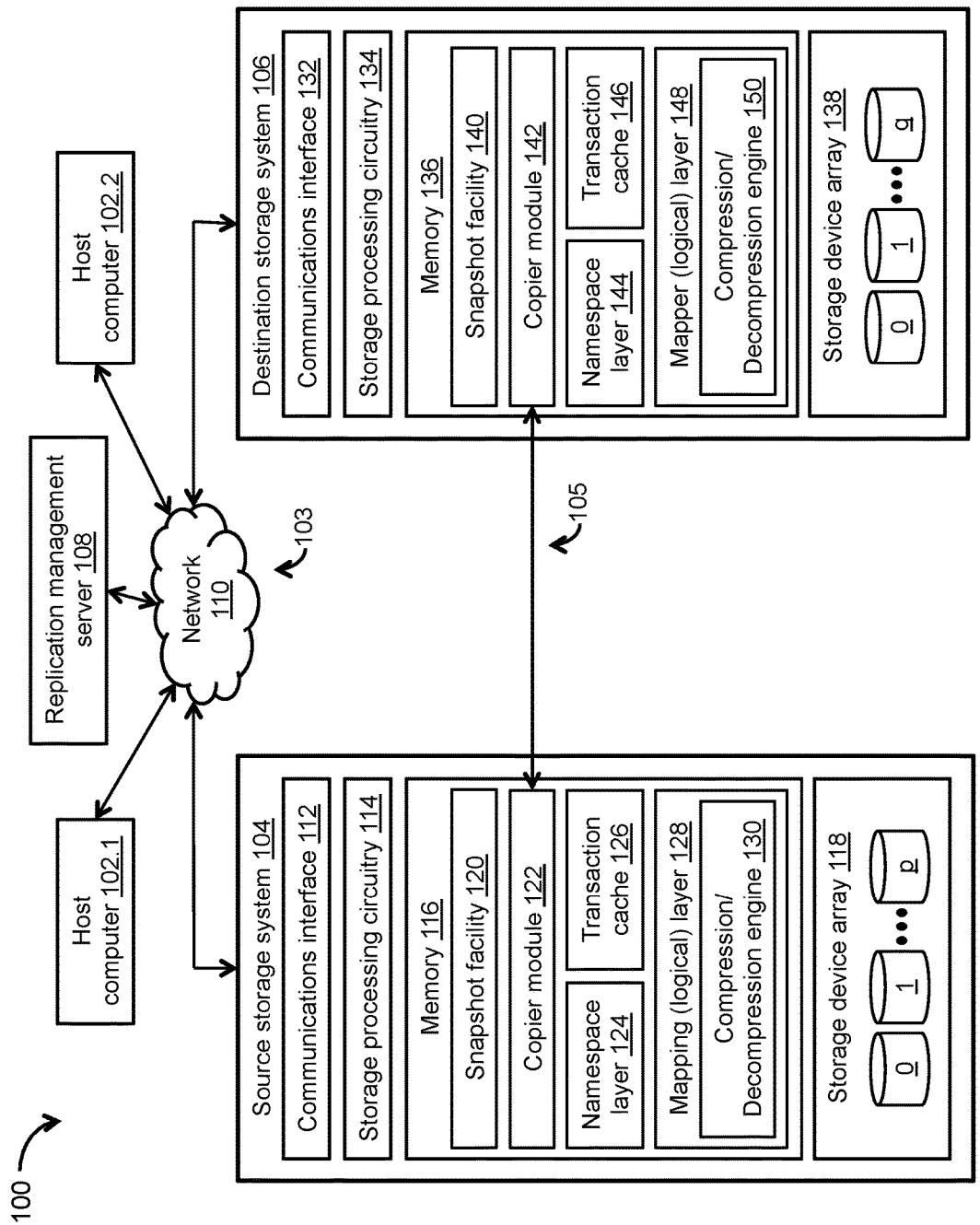
FIG. 1 is a block diagram of an exemplary data storage environment in which techniques can be practiced for providing a direct input/output (IO) path to compressed data on storage media of a source storage system.

FIG. 1 depicts an illustrative embodiment of an exemplary data storage environment 100 in which techniques can be practiced for providing a direct IO path to compressed data on storage media of a source storage system. As shown in FIG. 1, the data storage environment 100 can include a plurality of host computers 102.1, 102.2, a source storage system 104, a destination storage system 106, a replication management server 108, and a communications medium 103 that includes at least one network 110. For example, each of the plurality of host computers 102.1, 102.2 can be configured as a web server computer, a file server computer, an email server computer, an enterprise server computer, and/or any other suitable client/server computer or computerized device. The plurality of host computers 102.1, 102.2 can be configured to provide, over the network 110, storage input/output (IO) requests (e.g., small computer system interface (SCSI) commands, network file system (NFS) commands) to the source storage system 104 and/or the destination storage system 106. For example, each such storage IO request (e.g., IO write request, IO read request) can direct the source storage system 104 and/or the destination storage system 106 to write or read data blocks, data pages, data files, and/or any other suitable data elements (also referred to herein as "host data") to/from virtual volumes (e.g., VMware® virtual volumes (VVOLs)), logical units (LUs), file systems, directories, files, and/or any other suitable storage objects maintained in association with the respective source and/or destination storage systems 104, 106.

The communications medium 103 can be configured to interconnect the plurality of host computers 102.1, 102.2, the source storage system 104, the destination storage system 106, and/or the replication management server 108 to enable them to communicate and exchange data and/or control signaling. As shown in FIG. 1, the communications medium 103 is illustrated as a "cloud" to represent different communications topologies such as a backbone topology, a hub-and-spoke topology, a loop topology, an irregular topology, and so on, or any suitable combination thereof. As such, the communications medium 103 can include copper based data communications devices and cabling, fiber optic based communications devices and cabling, wireless communications devices, and so on, or any suitable combination thereof. Further, the communications medium 103 can be configured to support storage area network (SAN) communications, network attached storage (NAS) communications, local area network (LAN) communications, metropolitan area network (MAN) communications, wide area network (WAN) communications, wireless communications, distributed infrastructure communications, and/or any other suitable communications.

The source storage system 104 can include a communications interface 112, storage processing circuitry 114, a memory 116, and a storage device array 118. Likewise, the destination storage system 106 can include a communications interface 132, storage processing circuitry 134, a memory 136, and a storage device array 138. The communications interfaces 112, 132 can include SCSI target adapters, network interface adapters, and/or any other suitable adapters for converting electronic, optical, and/or wireless signals received over the network 110 to a form suitable for use by the storage processing circuitries 114, 134, respectively. The memories 116, 136 can include persistent memory (e.g., flash memory, magnetic memory) and/or non-persistent memory (e.g., dynamic random access memory (DRAM), static random access memory (SRAM)). Further, the memory 116 of the source storage system 104 can accommodate a plurality of specialized software modules and/or logical constructs, including a snapshot facility 120, a copier module 122, a namespace layer 124, an IO transaction cache 126, and a mapping (logical) layer 128, which can include a compression/decompression engine 130. Likewise, the memory 136 of the destination storage system 106 can accommodate a plurality of specialized software modules and/or logical constructs, including a snapshot facility 140, a copier module 142, a namespace layer 144, an IO transaction cache 146, and a mapping (logical) layer 148, which can include a compression/decompression engine 150.

The storage processing circuitries 114, 134 can each include one or more physical storage processors and/or engines configured to execute the various specialized software modules and/or logical constructs, data movers, director boards, blades, IO modules, storage drive controllers, switches, and/or any other suitable computer hardware or combination thereof. For example, the storage processing circuitries 114, 134 can execute such specialized software modules/logical constructs as program instructions out of the memories 116, 136, respectively, process storage IO requests (e.g., IO write requests, IO read requests) issued by the respective host computers 102.1, 102.2, and store host data and metadata and/or snapshot data and metadata in any suitable data storage environment (e.g., a clustered or de-clustered Redundant Array of Inexpensive/Independent Disks (RAID) environment, a mapped RAID environment) implemented by the storage device arrays 118, 138, respectively.

In the context of the storage processing circuitries 114, 134 being implemented using one or more processors executing specialized software modules/logical constructs, a computer program product can be configured to deliver all or a portion of the specialized software modules/logical constructs to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective processor(s), the various techniques disclosed herein.

The storage device array 118 of the source storage system 104 can include a plurality of storage devices 0, 1, . . . , p (e.g., hard disk drives (HDDs), solid state drives (SSDs), flash devices) configured to provide access to source storage object data/metadata organized as VVOLs, LUs, file systems, directories, files, and so on. Likewise, the storage device array 138 of the destination storage system 106 can include a plurality of storage devices 0, 1, . . . , q (e.g., HDDs, SSDs, flash devices) configured to provide access to destination storage object data/metadata organized as VVOLs, LUs, file systems, directories, files, and so on.

The replication management server 108 can be configured to manage execution of jobs for replicating source storage objects on the source storage system 104 to destination storage objects on the destination storage system 106. For example, the replication management server 108 can control the timing of snapshot creation and/or deletion, as well as the timing of data transmissions or transfers from the source storage system 104 to the destination storage system 106. As employed herein, the term "snapshot" refers to a point-in-time (PIT) replica or copy of a storage object (e.g., VVOL, LU, file system, directory, file), along with its associated snapshot metadata. Such a snapshot can be a replica of a full copy of a storage object, or a space-efficient copy that stores changes or differences in data between a current version of the storage object and a prior version that existed at the time when a snapshot was last captured or created. The replication management server 108 can also schedule the execution of replication jobs to assure that a replica or copy (e.g., a snapshot) is not out-of-sync with a source storage object or prior snapshot by more than a specified amount of time.

The snapshot facilities 120, 140 of the respective source and destination storage systems 104, 106 can each be configured to service backup requests for performing full or incremental backups of storage objects (e.g., VVOLs, LUs, file systems, directories, files) based on snapshot policies for the respective storage objects. The snapshot facilities 120, 140 can each service such backup requests by performing "redirect-on-write" operations, "copy-on-write" operations, or any other suitable backup operations. For example, if a backup request is to be serviced at a PIT when one or more data blocks of a source storage object are not subject to being modified by an IO write request, then the snapshot facility 120 can capture or otherwise create a block-level snapshot of the source storage object by storing mapping metadata that refers to the original data blocks of the source storage object. If a backup request is to be serviced at a PIT when one or more data blocks of the source storage object are subject to being modified by an IO write request, then the snapshot facility 120 can capture or create a snapshot of the source storage object by performing a redirect-on-write operation, redirecting the IO write request to newly allocated space for the data block(s) on the source storage object, writing new block data to the newly allocated space, and storing mapping metadata that refers to the original unmodified data block(s) on the source storage object. It is noted that the snapshot facility 140 of the destination storage system 106 can be configured to provide functionality like that of the snapshot facility 120 of the source storage system 104.

The copier modules 122, 142 of the respective source and destination storage systems 104, 106 can each be configured to perform asynchronous data replication (also referred to herein as "asynchronous replication") at time-based intervals. The replication management server 108 can issue replication jobs that schedule asynchronous replication sessions to be conducted by the copier module 122. Further, replicated data can be transmitted or transferred from the copier module 122 of the source storage system 104 to the copier module 142 of the destination storage system 106 over a separate data channel 105 (e.g., Fiber Channel (FC), SCSI, iSCSI, Ethernet, FC over Ethernet). For example, the copier module 122 can transmit or transfer a snapshot of a source storage object from the source storage system 104 to a destination storage object on the destination storage system 106 over the data channel 105.

The namespace layers 124, 144 of the respective source and destination storage systems 104, 106 are each logical structures that can be configured to organize storage objects such as VVOLs, LUs, file systems, directories, files, and so on, and to track logical addresses of the respective storage objects such as offsets into LUs or file system addresses. The mapping (logical) layer 128 of the source storage system 104 is a logical structure that can be configured to map the logical addresses of storage objects (to which IO read/write requests may be directed) to their corresponding physical locations on the storage device array 118. Likewise, the mapping (logical) layer 148 of the destination storage system 106 is a logical structure that can be configured to map the logical addresses of storage objects (to which IO read/write requests may be directed) to their corresponding physical locations on the storage device array 138. It is noted that the mapping (logical) layers 128, 148 of the source and destination storage systems 104, 106, respectively, are each also referred to herein simply as the "logical layer."

The mapping (logical) layer 128 of the source storage system 104 can include the compression/decompression engine 130, and the mapping (logical) layer 148 of the destination storage system 106 can likewise include the compression/decompression engine 150. The compression/decompression engines 130, 150 can be configured to compress storage object data and/or metadata (including snapshot data and/or metadata) prior to writing the data/metadata to the storage device arrays 118, 138, respectively, as well as decompress the storage object data and/or metadata (including snapshot data and/or metadata) subsequent to reading the data/metadata from the storage device arrays 118, 138, respectively. It is noted that such compressed storage object data can be deduplicated using any suitable deduplication technique, or the storage object data can be deduplicated prior to being compressed. It is further noted that the compression/decompression engines 130, 150 can each also be configured to determine an average compression ratio of the data that is to be stored in the respective storage device arrays 118, 138, and to store such information (as well as information pertaining to specific algorithms used to perform data compression/decompression, checksums for checking the integrity of the decompressed data, etc.) in metadata (e.g., snapshot metadata, mapping metadata) in the respective IO transaction caches 126, 146 and/or on the storage device arrays 118, 138.

The IO transaction caches 126, 146 (also referred to herein as the "transaction cache(s)") of the respective source and destination storage systems 104, 106 can be configured to store, persistently and at least temporarily, data from IO write requests prior to the data being written to the respective storage device arrays 118, 138, as well as data from IO read requests subsequent to the data being read from the respective storage device arrays 118, 138. As such, the source and destination storage systems 104, 106 can each provide an acknowledgement that such data has been stored on the respective storage systems, even though the data has actually been stored in an IO transaction cache, which is waiting for a suitable time to transfer (i.e., flush) the data from the IO transaction cache to a physical storage device. Because storing data to cache memory is faster than storing the data to a physical storage device (e.g., a disk drive), each of the IO transaction caches 126, 146 can be configured to store a large amount of data/metadata (e.g., storage object data/metadata, snapshot data/metadata) in anticipation of subsequently storing the data/metadata to the slower physical storage device.

FIG. 2 depicts several elements of a typical source storage system 200, including a copier module 202, a namespace layer 204, a mapping (logical) layer 206, an IO transaction cache 210, and a storage device array 208, in which an IO path to data stored on the storage device array 208 includes the IO transaction cache 210. While performing asynchronous replication at the source storage system 200, a snapshot of a source storage object can be created and stored as compressed data on storage media of the storage device array 208. Further, dirty data pages are flushed from the IO transaction cache 210 to assure that mapping metadata for the respective storage objects are updated. It is noted that data stored in an IO transaction cache are referred to herein as "dirty data" if the data has not been flushed from the IO transaction cache to a physical storage device. Such data stored and retained in the IO transaction cache are referred to herein as "clean data" once the data has been flushed from the IO transaction cache to the physical storage device.

Having flushed the dirty data pages from the IO transaction cache 210 and updated the mapping metadata, the compressed snapshot data (along with its associated snapshot metadata) are read or obtained from the storage media of the storage device array 208 to the mapping (logical) layer 206 over a path "1," decompressed, and checked for data integrity by comparing a checksum of the decompressed snapshot data against the checksum stored in its snapshot metadata. Upon successful completion of the data integrity check, the decompressed snapshot data/metadata are transferred from the mapping (logical) layer 206 to the transaction cache 210 over a path "2." Copies of the decompressed snapshot data/metadata are then provided from the transaction cache 210 to the mapping (logical) layer 206 over a path "3," provided from the mapping (logical) layer 206 to the namespace layer 204 over a path "4," and ultimately provided from the namespace layer 204 to the copier module 202 over a path "5" for subsequent transmission or transfer over a data channel (i.e., a path "6") from the copier module 202 to a destination storage system (not shown). As shown in FIG. 2, the IO path from the storage device array 208 to the copier module 202 includes the paths "1," "2," "3," "4," and "5," a portion of which passes through the transaction cache 210.

FIG. 3 depicts several elements of a source storage system 300, including a copier module 302, a namespace layer 304, a mapping (logical) layer 306, an IO transaction cache 310, and a storage device array 308. In the source storage system 300, an IO path to compressed data stored on the storage device array 308 can be a direct IO path, i.e., no portion of the IO path passes through the transaction cache 310. While performing asynchronous replication at the source storage system 300, a snapshot of a source storage object can be created as a read-only snapshot, which can be stored as compressed data on storage media of the storage device array 308. Further, dirty data pages can be flushed from the transaction cache 310 to assure that mapping metadata for the respective storage objects are updated.

Having flushed the dirty data pages from the transaction cache 310 and updated the mapping metadata, the compressed snapshot data (along with its associated snapshot metadata) can be read or obtained from the storage media of the storage device array 308 to the mapping (logical) layer 306 over a path "1'," without being decompressed and transferred from the mapping (logical) layer 306 to the transaction cache 310. The compressed data/metadata can then be provided from the mapping (logical) layer 306 to the namespace layer 304 over a path "2'," and ultimately provided from the namespace layer 304 to the copier module 302 over a path "3'" for subsequent transmission or transfer over a data channel (i.e., a path "4'") from the copier module 302 to a destination storage system (not shown). As shown in FIG. 3, the IO path from the storage device array 308 to the copier module 302 includes the paths "1'," "2'," and "3'," no portion of which passes through the transaction cache 310. It is noted that the snapshot metadata associated with the read-only snapshot can optionally be transferred from the mapping (logical) layer 306 to the transaction cache 310. It is further noted that the snapshot data/metadata can be transmitted or transferred as compressed data over the path "4'" to the destination storage system (not shown) for increased data transfer efficiency.

The disclosed techniques for providing a direct IO path to compressed data on storage media of a source storage system will be further understood with reference to the following illustrative example, as well as FIG. 1. In this example, it is assumed that the replication management server 108 manages execution of a job for performing asynchronous replication of a snapshot storage object from the source storage system 104 (see FIG. 1) to a destination storage object on the destination storage system 106 (see also FIG. 1). It is further assumed that the snapshot storage object is a read-only snapshot containing compressed data, and that one or more copies of the read-only snapshot are stored as compressed data in at least one of the plurality of storage devices 0, 1, . . . , p of the storage device array 118, and, optionally, in the transaction cache 126. For example, the copier module 122 in association with the snapshot facility 120 can act to create the read-only snapshot of a source storage object, one or more copies of which can also be stored in at least one of the plurality of storage devices 0, 1, . . . , p of the storage device array 118 and, optionally, in the transaction cache 126.

In this example, the copier module 122 of the source storage system 104 replicates the read-only snapshot storage object from the source storage system 104 to a destination storage object on the destination storage system 106 over the data channel 105. To that end, the copier module 122 issues a request, such as a "snap differential" or "snap_diff" bitmap request, to the namespace layer 124 to obtain any changes or differences in data between the compressed snapshot and source storage objects. For example, such data differences can be obtained using an application programming interface (API) such as the snap_diff bitmap API or any other suitable technique. Upon receipt of the snap_diff bitmap request at the namespace layer 124, a flush of dirty data pages from the transaction cache 126 is triggered to assure that mapping metadata for the respective storage objects are updated. Once the dirty data pages have been flushed from the transaction cache 126, the mapping metadata has been updated, and IO write requests directed to the source storage object have been blocked, the namespace layer 124 satisfies the snap_diff bitmap request to obtain the data differences between the compressed snapshot and source storage objects. Further, the copier module 122 issues a specialized storage IO request operation code ("opcode"), namely, an IO read compressed request, to the namespace layer 124. In response to receipt of the IO read compressed request, the namespace layer 124 validates the IO read compressed request to assure that the request is made against a read-only storage extent, and, once validated, issues the IO read compressed request to the mapping (logical) layer 128, which avoids forwarding the IO read compressed request to the IO transaction cache 126.

Upon receipt of the IO read compressed request from the namespace layer 124, the mapping (logical) layer 128 reads or obtains the compressed snapshot data (along with its associated snapshot metadata) from one or more of the storage devices 0, 1, . . . , p of the storage device array 118. It is noted that, at this time, the compressed snapshot data/metadata are not decompressed or checked for data integrity against a checksum. The compressed snapshot data (or data differences) and metadata are then provided, via the mapping (logical) layer 128 and the namespace layer 124, to the copier module 122. Having received the compressed snapshot data (or data differences) and metadata, the copier module 122 issues, over the data channel 105, a specialized storage IO request opcode, namely, an IO write compressed request containing the compressed snapshot data (or data differences) and metadata, to the copier module 142 of the destination storage system 106.

Once the IO write compressed request is received from the copier module 122 of the source storage system 104, the copier module 142 of the destination storage system 106 issues the IO write compressed request containing the compressed snapshot data (or data differences) and metadata to the namespace layer 144, which issues the IO write compressed request (with a compressed data buffer and cached page buffer as input) to the mapping (logical) layer 148. Having received the IO write compressed request from the namespace layer 144 at the mapper (logical) layer 148, the compression/decompression engine 150 decompresses the compressed snapshot data (or data differences) and metadata. Further, a data integrity check is performed on the decompressed data against the checksum contained in the snapshot metadata. Upon successful completion of the data integrity check at the destination storage system 106, the mapper (logical) layer 148 forwards the decompressed snapshot data (or data differences) and metadata to the IO transaction cache 146, which flushes the data/metadata at a suitable time to at least one of the plurality of storage devices 0, 1, . . . , q of the storage device array 138.

It is noted that, if the data integrity check at the destination storage system 106 is unsuccessful, a checksum error indication can be sent from the destination storage system 106 over the data channel 105 to the source storage system 104. Upon receipt of the checksum error indication at the source storage system 104, the copier module 122 can issue an IO read request for the compressed snapshot data/metadata stored on the source storage system 104. The compression/decompression engine 130 can then decompress the compressed snapshot data/metadata, and a data integrity check can be performed at the source storage system 104 on the decompressed snapshot data against the checksum contained in the snapshot metadata. Upon successful completion of the data integrity check, another IO read compressed request may be issued for the compressed snapshot data/metadata stored on the source storage system 104, and the compressed snapshot data (or data differences) and metadata can be retransmitted or retransferred over the data channel 105 to the destination storage system 106.

It is further noted that the disclosed techniques for providing a direct IO path to compressed data on storage media of a source storage system can be used to reduce processing overhead in high availability data storage systems, by reducing the processing involved in synchronizing redundant IO transaction cache components.

Figure 4:
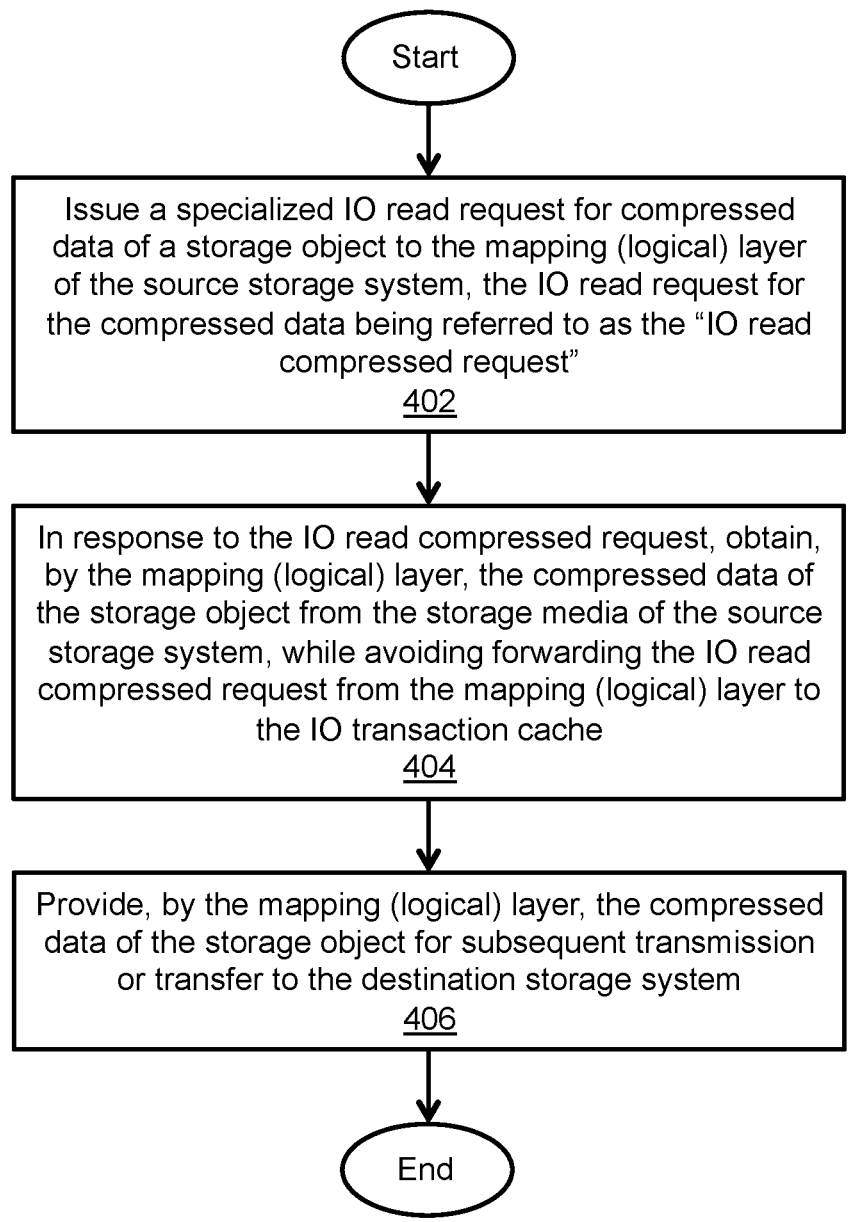
FIG. 4 is a flow diagram of an exemplary method of providing a direct IO path to compressed data on storage media of a source storage system.

An exemplary method of transferring data from a source storage system to a destination storage system is described below with reference to FIG. 4. The source storage system includes a mapping (logical) layer, an IO transaction cache, and storage media. As depicted in block 402, a specialized IO read request for compressed data of a storage object is issued to the mapping (logical) layer of the source storage system, in which the IO read request for the compressed data is referred to as the "IO read compressed request." As depicted in block 404, in response to the IO read compressed request, the compressed data of the storage object is obtained, by the mapping (logical) layer, from the storage media of the source storage system, while avoiding forwarding the IO read compressed request from the mapping (logical) layer to the IO transaction cache. As depicted in block 406, the compressed data of the storage object is provided, by the mapping (logical) layer, for subsequent transmission or transfer to the destination storage system.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a file system, object storage, a virtualized device, a logical unit (LU), a logical unit number (LUN), a logical volume, a logical device, a physical device, and/or a storage medium. An LU may be a logical entity provided by a storage system for accessing data from the storage system. An LU may be used interchangeably with a logical volume. An LU or LUN may be used interchangeably with each other. A LUN may be a logical unit number for identifying an LU, and may also refer to one or more virtual disks or virtual LUNs, which may correspond to one or more virtual machines. A physical storage unit may be a physical entity, such as a drive or disk or an array of drives or disks, for storing data in storage locations that can be accessed by address. A physical storage unit may used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, and may include multiple levels of virtual-to-physical mappings, and may be or include an image or disk image. A storage medium may be computer-readable, and may also be referred to as a computer-readable program medium.

As employed herein, the term "IO request" or simply "IO" may be used to refer to an input or output request, such as a data read request or a data write request.

As employed herein, the terms, "such as," "for example," "e.g.," "exemplary," and variants thereof, describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of transferring data from a source data storage system to a destination data storage system, the source data storage system including a mapping layer, an input/output (IO) transaction cache, and storage media, the method comprising:
issuing an IO read request for compressed data of a storage object to the mapping layer of the source data storage system;
in response to the IO read request for compressed data of the storage object, obtaining, by the mapping layer, the compressed data of the storage object from the storage media of the source data storage system, while avoiding decompressing and caching the compressed data of the storage object; and
providing, by the mapping layer, the compressed data of the storage object for subsequent transmission or transfer to the destination data storage system,
wherein the compressed data of the storage object is compressed snapshot data of the storage object,
wherein the method further comprises:
comparing the compressed snapshot data against compressed data of the storage object to obtain differences in data between the compressed snapshot data and the compressed data of the storage object, and
wherein the providing of the compressed data of the storage object includes providing the differences in data between the compressed snapshot data and the compressed data of the storage object for subsequent transmission or transfer to the destination data storage system.

2. The method of claim 1 wherein the compressed data of the storage object is compressed read-only data of the storage object, and wherein the method further comprises:
validating that the IO read request for compressed data of the storage object is against a read-only storage extent.

3. The method of claim 1 further comprising:
issuing, over a data channel, an IO write request containing the compressed data of the storage object to the destination data storage system.

4. A source data storage system, comprising:
a memory configured to accommodate a mapping layer;
storage media; and
storage processing circuitry configured to execute program instructions out of the memory to:
issue an IO read request for compressed data of a storage object to the mapping layer;
in response to the IO read request for compressed data of the storage object, obtain, by the mapping layer, the compressed data of the storage object from the storage media, while avoiding decompressing and caching the compressed data of the storage object; and
provide, by the mapping layer, the compressed data of the storage object for subsequent transmission or transfer to a destination data storage system,
wherein the compressed data of the storage object is compressed snapshot data of the storage object, and
wherein the storage processing circuitry is further configured to execute the program instructions out of the memory to:
compare the compressed snapshot data against compressed data of the storage object to obtain differences in data between the compressed snapshot data and the compressed data of the storage object; and
provide the differences in data between the compressed snapshot data and the compressed data of the storage object for subsequent transmission or transfer to the destination storage system.

5. The source data storage system of claim 4 wherein the compressed data of the storage object is compressed read-only data of the storage object, and wherein the storage processing circuitry is further configured to execute the program instructions out of the memory to validate that the IO read request for compressed data of the storage object is against a read-only storage extent.

6. The source data storage system of claim 4 wherein the storage processing circuitry is further configured to execute the program instructions out of the memory to issue, over a data channel, an IO write request containing the compressed data of the storage object to the destination storage system.

7. A computer program product including a set of non-transitory, computer-readable media having instructions that, when executed by processing circuitry of a computerized apparatus, cause the processing circuitry to perform a method of transferring data from a source data storage system to a destination data storage system, the source data storage system including a mapping layer, an input/output (IO) transaction cache, and storage media, wherein the method comprises:
issuing an IO read request for compressed data of a storage object to the mapping layer of the source data storage system;
in response to the IO read request for compressed data of the storage object, obtaining, by the mapping layer, the compressed data of the storage object from the storage media of the source data storage system, while avoiding decompressing and caching the compressed data of the storage object; and
providing, by the mapping layer, the compressed data of the storage object for subsequent transmission or transfer to the destination data storage system,
wherein the compressed data of the storage object is compressed snapshot data of the storage object,
wherein the method further comprises:
comparing the compressed snapshot data against compressed data of the storage object to obtain differences in data between the compressed snapshot data and the compressed data of the storage object, and
wherein the providing of the compressed data of the storage object includes providing the differences in data between the compressed snapshot data and the compressed data of the storage object for subsequent transmission or transfer to the destination data storage system.

8. The computer program product of claim 7 wherein the compressed data of the storage object is compressed read-only data of the storage object, and wherein the method further comprises:
validating that the IO read request for compressed data of the storage object is against a read-only storage extent.

9. The computer program product of claim 7 further comprising:
  issuing, over a data channel, an IO write request containing the compressed data of the storage object to the destination data storage system.

10. The method of claim 1 wherein the source data storage system further includes a namespace layer, and wherein the providing of the compressed data of the storage object for subsequent transmission or transfer to the destination data storage system includes, having avoided decompressing and caching the compressed data of the storage object, providing the compressed data of the storage object from the mapping layer to the namespace layer.

* * * * *